Feb. 15, 1955

H. L. PAGE 2,701,915

DENTAL INSTRUMENT AND METHOD FOR REPRODUCING AND CORRECTING
WITH MODELS ARTICULATION OF THE HUMAN JAWS AND TEETH

Filed March 7, 1951

INVENTOR
HARRY L. PAGE

BY
Caswell & Lagaard
ATTORNEYS

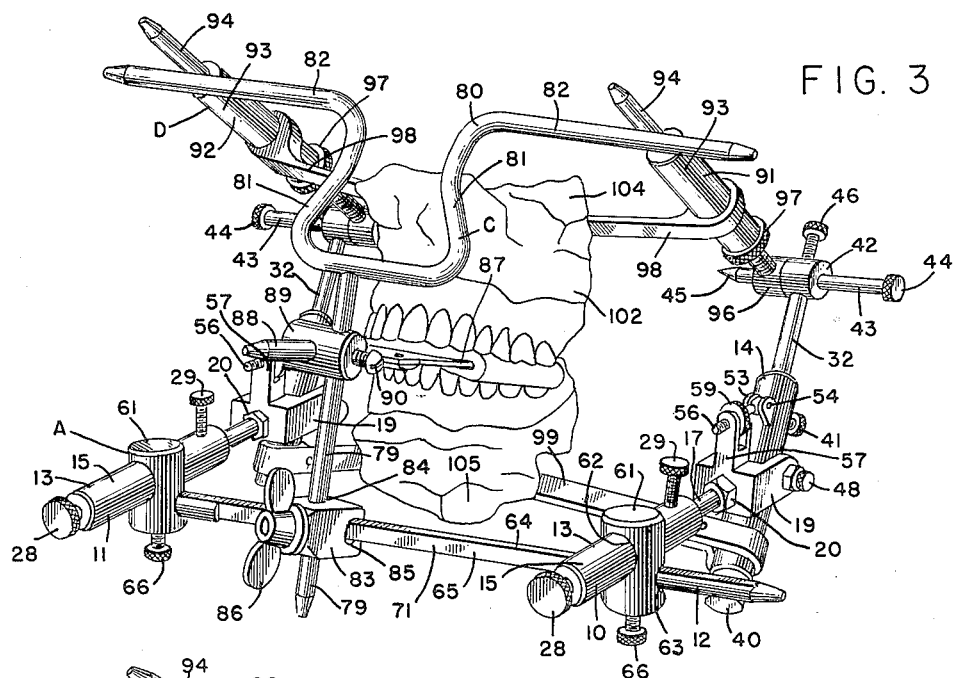
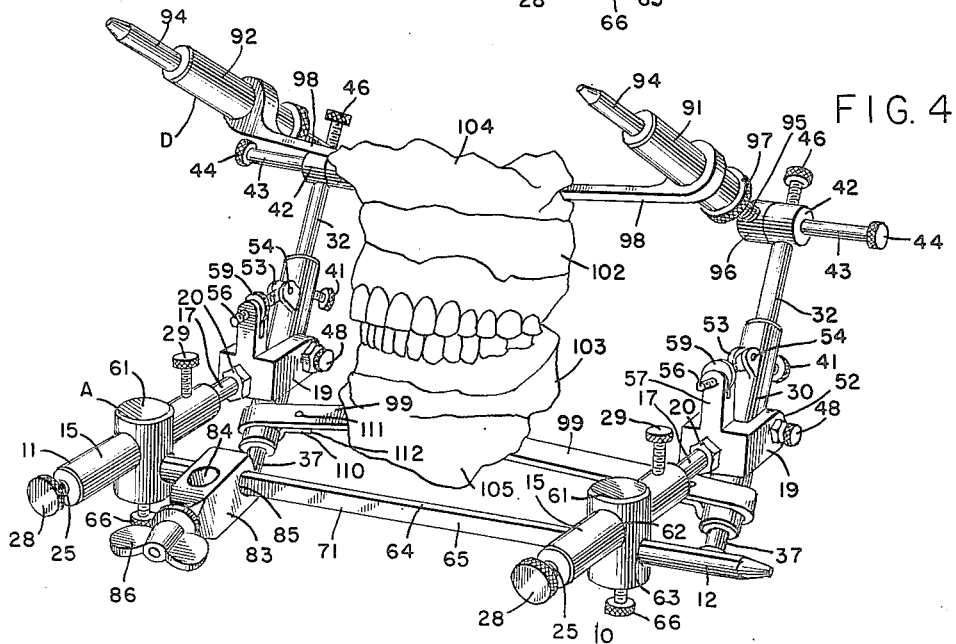

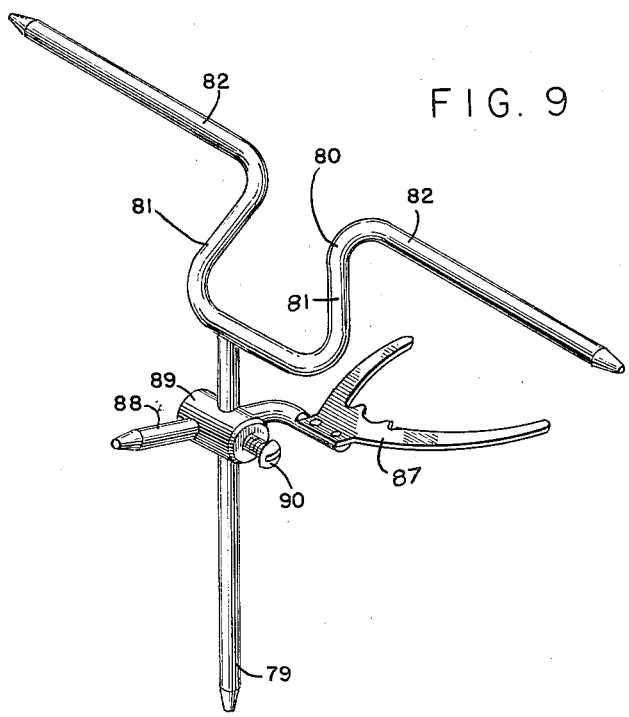
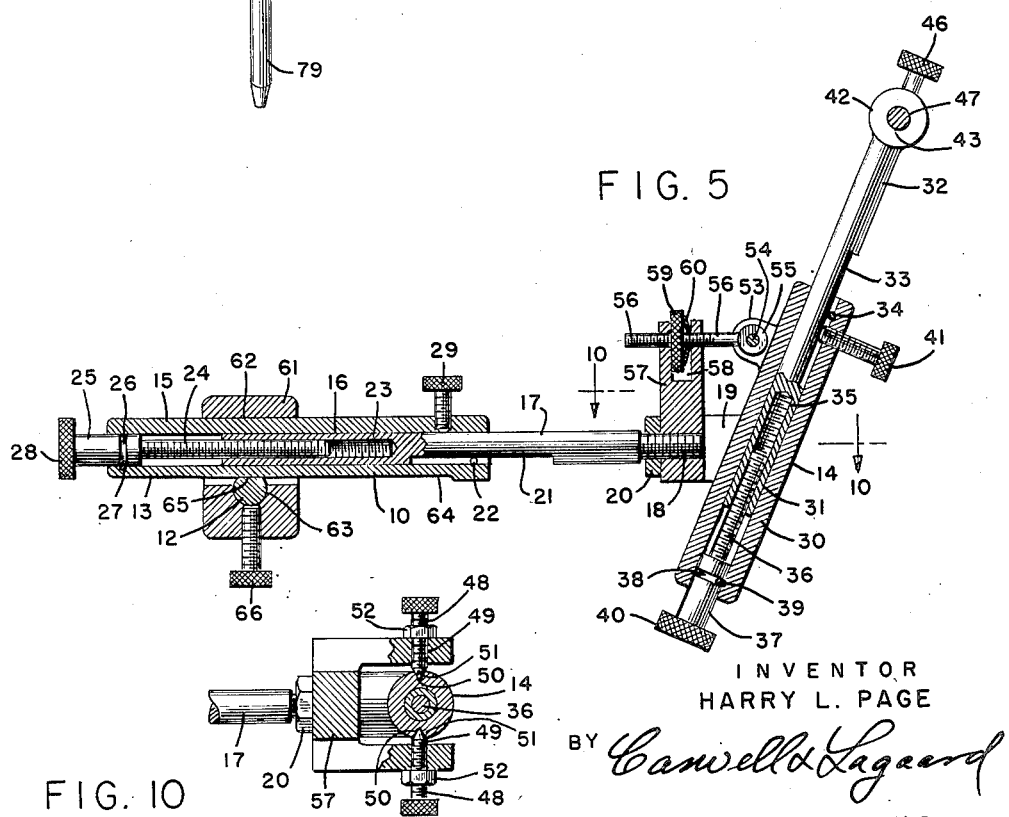

Feb. 15, 1955 H. L. PAGE 2,701,915
DENTAL INSTRUMENT AND METHOD FOR REPRODUCING AND CORRECTING
WITH MODELS ARTICULATION OF THE HUMAN JAWS AND TEETH
Filed March 7, 1951 5 Sheets-Sheet 4
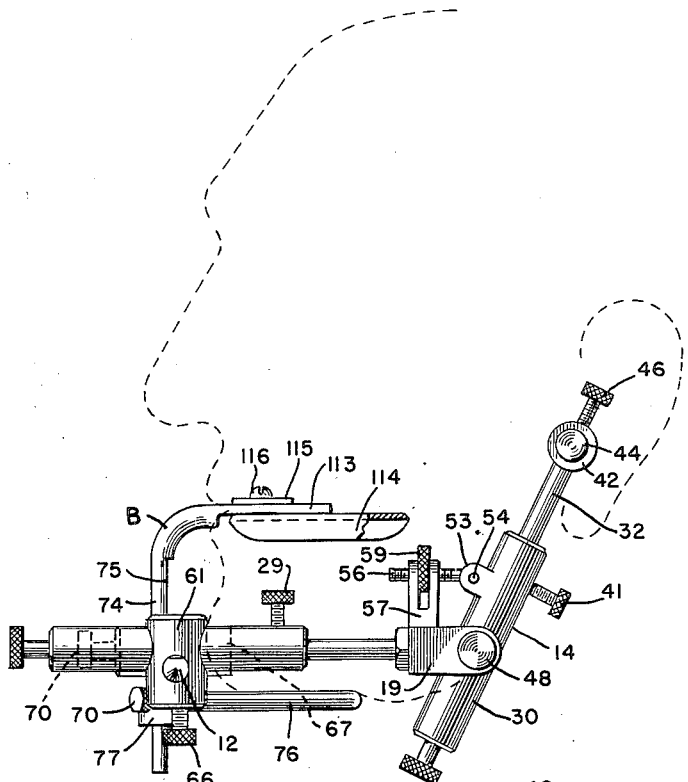
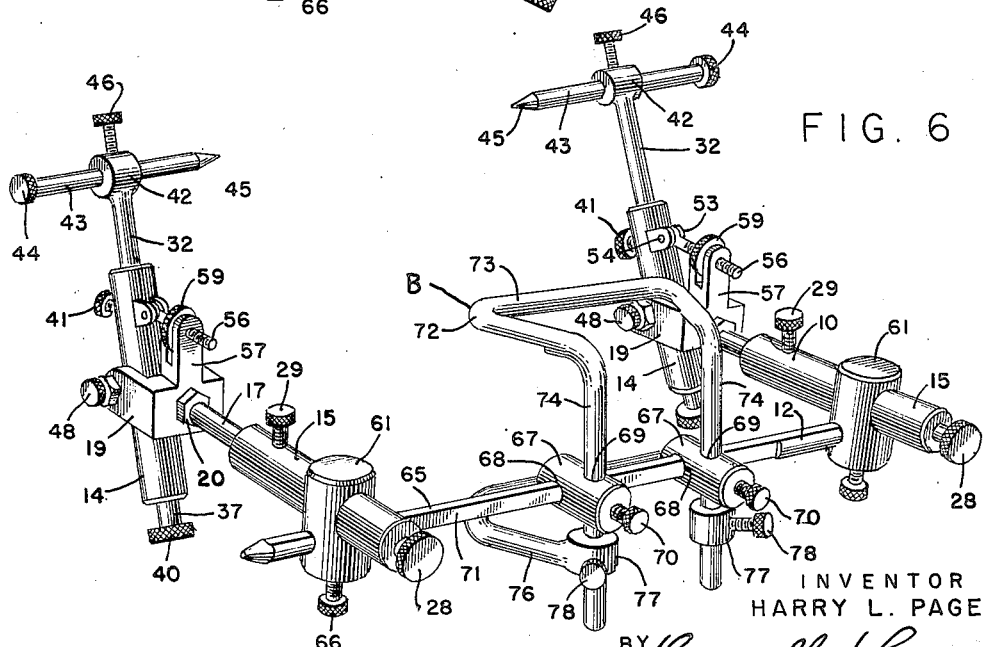
INVENTOR
HARRY L. PAGE
BY Caswell & Lagaard
ATTORNEYS

United States Patent Office

2,701,915
Patented Feb. 15, 1955

2,701,915

DENTAL INSTRUMENT AND METHOD FOR REPRODUCING AND CORRECTING WITH MODELS ARTICULATION OF THE HUMAN JAWS AND TEETH

Harry L. Page, Valparaiso, Ind., assignor to Transograph, Incorporated, Minneapolis, Minn., a corporation of Minnesota Application March 7, 1951, Serial No. 214,234

16 Claims. (Cl. 32—32)

The herein disclosed invention relates to dental instruments and methods for reproducing and correcting with models, articulation of the human jaws and teeth both natural and artificial, and has for an object to provide an instrument and a method which will accurately record and automatically reproduce in three dimensions simultaneously the kinematic and static relationships of the upper and lower jaws and upper and lower teeth both natural and artificial.

Another object of the invention resides in providing a dental instrument to which bite blocks or wax bites may be attached while in the patient's mouth and which itself is convertible into an articulator when the bite blocks are removed from the patient.

A still further object of the invention resides in providing an instrument by means of which the orientation of the natural symmetry and/or asymmetries of the skull and of the mandible are accurately reproduced.

Another object of the invention resides in providing a dental instrument by which the Bennet or lateral movement of the jaws occurring during opening and closing movement of the jaws may be reproduced during opening and closing movement of the instrument.

An object of the invention resides in providing a hinge bow adapted to be applied to the patient's mandible and having hinge axis pins adjustable to register with the projections on the face of the patient of the condylar hinge axes of the patient's condyles.

A further object of the invention resides in providing a clamp attachable to the hinge bow and adapted to be rigidly secured to the patient's mandible for supporting the hinge bow relative to the patient's mandible and to permit of adjusting the hinge axis pins to the hinge axis projections of the patient's condyles.

An object of the invention resides in providing a head relator adapted to be simultaneously attached to the hinge bow and to bite blocks or wax bites properly oriented in the patient's mouth for the purpose of orienting the instrument to the natural symmetries and/or asymmetries of the patient's skull and to the natural symmetries and/or asymmetries of the mandibular joints, rotational axes and occlusal surfaces.

Another object of the invention resides in providing apposing means adapted to be supported on the hinge pins and on the head relator after the hinge bow, head relator and bite blocks or wax bite have been removed intact from the patient's mouth and to which an upper jaw model may be attached.

A still further object of the invention resides in providing a lower jaw model support attachable to the hinge bow.

An object of the invention resides in providing a method of orienting models of the patient's upper and lower alveolar processes to the natural and anatomical symmetries and/or asymmetries of the skull and to the natural and anatomical symmetries and/or asymmetries of the mandible.

Another object of the invention resides in providing an instrument by means of which a coordinating point and plane are established containing the hinge axes and a point on the forward part of the cranium.

A still further object resides in providing a support reacting against the bridge of the nose for preventing jaw fatigue from the weight of the instrument and the sagging of the hinge bow due to its weight.

Other objects of the invention reside in the novel combination and arrangement of parts and in the details of construction hereinafter illustrated and/or described.

The structure disclosed comprises a hinge bow A which serves as supporting means for the various parts of the instrument. This hinge bow consists of two side frames connected to a cross bar. These side frames adjustably support hinge axis pins which, when the device is mounted in the patient's mouth, may be adjusted to register with the projections of the condylar hinge axes on the patient's face. The invention utilizes a mandible clamp B which may be attached to the hinge bow and which serves to secure the hinge bow to the mandible of the patient for use in determining the projections of the condylar hinge axes on the patient's face. Associated with the hinge bow is a head relator C which may be adjustably mounted on the hinge bow and which includes a bite fork adapted to be attached to bite blocks or a wax bite mounted in the patient's mouth and which serves to support the entire instrument thereby. The head relator includes two rests adapted to be adjusted to correspond with certain prominences or convenient anatomical reference points of the patient's cranium whereby the instrument may be properly oriented with reference to the natural symmetries and/or asymmetries of the skull and of the mandible. After the instrument has been removed from the patient's mouth an apposing device D is employed which is constructed with hinge pin bearings adapted to be mounted for swinging movement on the hinge pins of the hinge bow and which are adjusted to engage the rests formed on the head relator to properly position the same with reference to the anatomy of the cranium. The apposing device and the hinge bow carry mounting fingers for attachment of jaw models to the instrument while the jaw models are in engagement with the bite blocks or a wax bite and thus maintain proper relation between the models and bite blocks or wax bite.

In the drawings:

Fig. 3 is a perspective view similar to Fig. 1 showing models representing natural or artificial dentures mounted on the instrument and in engagement with a wax bite.

Fig. 4 is a view similar to Fig. 3 with the head relator and wax bite removed.

Fig. 5 is a longitudinal sectional elevational view taken on line 5—5 of Fig. 1.

Fig. 6 is a perspective view of the hinge bow with the mandible clamp mounted thereon and viewed from the front and right side.

Fig. 7 is a side elevational view illustrating the application of the instrument to the mandible of the patient for the purpose of determining the hinge axis projections on the patient's face.

Fig. 9 is a perspective view of the head relator viewed from the front and right.

Fig. 10 is a cross sectional detail view taken on line 10—10 of Fig. 5.

Figure 1:
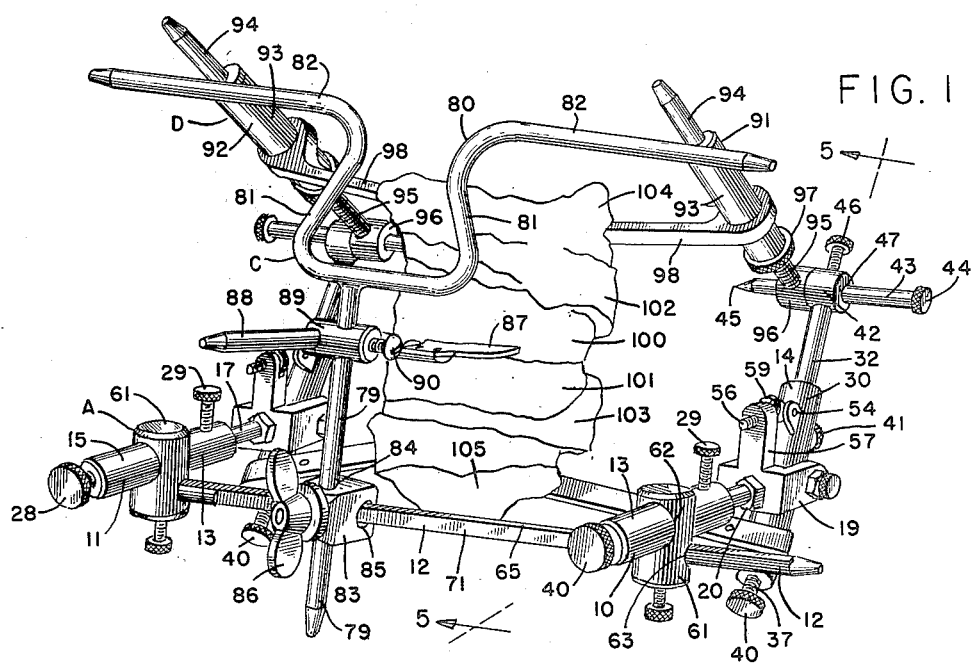
Fig. 1 is a perspective view of a dental instrument illustrating an embodiment of the invention and showing the various parts assembled and illustrating bite blocks with jaw models associated therewith and mounted on the apposing device and hinge bow of the instrument and viewed from the left and front of the device.

The hinge bow A consists of two side frames 10 and 11 which are identical in construction and which are attached to a cross bar 12. These frames being of the same construction only the frame 10 will be described and which is shown in detail in Fig. 5. This frame consists of a horizontal arm 13 and to which is pivotally connected an upright arm 14. The horizontal arm comprises a barrel 15 which is formed with a bore 16. Slidably mounted in the bore 16 is a stem 17 which is threaded at one end as indicated at 18 to screw into a clevis 19. A lock nut 20 holds the said stem securely in position. The stem 17 is constructed with a flat 21 which engages a pin 22 mounted in the barrel 15. This pin holds the stem 17 from rotation relative to the barrel 15 but permits longitudinal movement thereof. The outer end of the stem 17 is formed with internal threads 23 and into which may be screwed an adjusting screw 24. This screw has a shank 25 received in the bore 16 and is constructed with an annular groove 26. A pin 27 mounted in the barrel 15 engages in the groove 26 and holds the screw 24 from longitudinal movement. The screw 24 is formed with a knurled head 28 by means of which the same may be conveniently rotated. A set screw 29 is screwed into the barrel 15 and engages stem 17 and holds the parts locked relative to one another.

The upright arm 14 consists of a barrel 30 similar to the barrel 15 and which is formed with a bore 31. In this bore is slidably mounted a stem 32 which is formed with a flat 33. A pin 34 carried by the barrel 30 engages the flat 33 and prevents rotation of the stem with reference to the said barrel. The inner end of the stem 32 is formed with internal threads 35 which receive a screw 36. This screw has a shank 37 rotatably mounted in the end of the bore 31 and which is formed with an annular groove 38. A pin 39 carried by the barrel 30 engages in the said groove and restrains the screw 36 from longitudinal movement. This screw, similar to the screw 24, is formed with a knurled head 40. A set screw 41 is screwed into the barrel 30 and engages the flat 33 of stem 32 and locks the same from movement relative to the barrel 30. The upper end of the stem 32 is formed with a guide 42 having a bore 47 in which is slidably mounted a hinge axis pin 43. This pin has a knurled head 44 by means of which the same may be manipulated and a pointer 45 at the inner end of the same. A set screw 46 screwed into the guide 42 holds the pin 43 in adjusted position.

The upright arm 14 is hingedly connected to the horizontal arm 13 by means of the clevis 19. This clevis has on each side of the same, as shown in Fig. 10, two screws 48 which have threaded shanks 49 screwed into the arms of the clevis. These shanks are formed with conical pivots 50 at the inner ends of the same and which engage into sockets 51 in the sides of the barrel 30 of the upright arm 14. Lock nuts 52 on the shanks 49 hold the screws 48 in adjusted position.

The barrel 30 is formed with spaced lugs 53 projected outwardly therefrom. Between these lugs is disposed the head 55 of an adjusting screw 56 and which is pivoted to said lugs by means of a pintle 54. The screw 56 projects through a post 57 formed on the clevis 19. This post has a kerf 58 cut in the same at right angles to the axis of the screw 56. In this kerf is mounted a nut 59 which is frictionally held in engagement with the walls of said post by means of a spring washer 60. By means of this construction the angularity of the upright arm 14 may be adjusted by rotating the nut 59. Spring washer 60 holds the parts in adjusted position and eliminates play between the parts. The screws 28 and 40 and the nut 59 and associated parts constitute adjustments whereby the hinge axis pins may be moved forwardly and rearwardly and in an up and down direction.

For the purpose of attaching the cross bar 12 to the side frames 10 and 11, two connectors 61 are employed which are identical in construction. Only the connector used in conjunction with the side frame 10 will be described. This connector consists of a short length of rod which is formed with two horizontal bores 62 and 63 extending at right angles to one another. The barrel 15 of the horizontal arm 13 is slidably mounted in the bore 62 while the cross bar 12 is slidably mounted in the bore 63. These bores intersect each other as best shown in Fig. 5. On the under side of the barrel 15 is formed a flat 64 and on the upper side of the cross bar 12 is formed a flat 65. These flats are adapted to engage each other as shown in Fig. 5 and the bore 63 has sufficient play so that the cross bar 12 may be urged toward the barrel 15. A set screw 66 screwed into the lower end of the connector 61 engages the cross bar 12 and forces the same against the barrel 15. When the screw 66 is tightened the parts are clamped together and the flats formed on the barrel and cross bar restrain relative rotational movement of the parts. The hinge bow A serves as supporting means for other of the parts of the invention.

The mandible clamp B, best shown in Fig. 6, includes two connectors 67 which are similar to the connectors 61. These connectors have intersecting bores 68 and 69 and are provided at their ends with set screws 70. The cross bar 12 is received in the bores 68 and is formed with a flat 71 at the forward portion of the same. Operating in conjunction with the connectors 67 is a clamp structure 72. This clamp structure is constructed from a rod bent to form a U-shaped upper clamp member 73 having legs 74 depending therefrom. The said legs have flats 75 (Fig .7) formed on the inner portions of the same and which are adapted to engage the flat 71 on the cross bar 12. When the set screws 70 are tightened the clamp structure 72 is held in proper position. The mandible clamp further includes a chin brace 76 which forms a lower clamp member and which is constructed from a rod bent U-shaped in form. The ends of this rod have attached to them guides 77 which slidably receive the legs 74 of the clamp structure 72. Set screws 78 screwed into said guides engage the legs 74 and hold the chin brace 76 in proper position. The clamp member 73 is milled to form a flat on the under surface thereof. An impression tray 114 underlies the clamp member 72 and bears against this flat. Overlying the clamp member 73 is a plate 115. Screws 116 pass through this plate and are screwed into the tray 114. By means of this construction the tray 114 may be adjusted both laterally and in an anterior-posterior direction.

The head relator C of the invention is best shown in Fig. 9. This head relator comprises a nasal bearing member 80 which is attached to the upper end of an upright or rod 79. This member is of inverted U-shaped form to straddle the nose of the patient and is constructed with spaced inverted legs 81 forming an opening therebetween through which the nose of the patient may project. Issuing outwardly from the legs 81 are two rests 82 which are disposed in alignment with one another. The outer surfaces of these rests form aligning bearing surfaces which serve a purpose to be presently described. The legs 81 and the rests 82 may be constructed from a length of rod bent into the desired form and is welded to the upright 79. The upright rod 79 is adapted to be attached to the cross bar 12 by means of a connector 83. This connector is formed with two bores 84 and 85 at right angles to one another. The bore 84 receives the rod 79 while the bore 85 receives the cross bar 12. A thumb screw 86 screwed into the end of the connector 83 engages the rod 79 and urges the same toward the cross bar 12. The rod 79 is formed without a flat so that the head relator may be adjusted to conform to the asymmetries of the patients faces. Also the bores 84 and 85 are made sufficiently large so that the head relator may be rotated about the axis of the set screw 86 as a pivot to a limited extent.

The head relator C further includes a bite fork or bite fork member 87 of ordinary construction. This fork has secured to it a stem 88 which projects outwardly therefrom. By means of a connector 89, similar to the connectors 67 and mounted on rod 79 and on stem 88, the bite fork 87 may be adjusted vertically and in a back and forth direction. The upper end of rod 79, the connector 89, and the stem 88 form connecting means between the nasal bearing member and the bite fork. The lower end of the rod 79, the connector 89, the stem 88 and bite fork 87 serve as attaching means for attaching the bite blocks to the supporting means, namely, the hinge bow A.

The apposing device D consists of two arms 91 and 92. Both of these parts are similar in construction and only the arm 91 will be described. This arm has a barrel 93 which terminates at its outer end in a contactor 94 in the form of a rod. The inner end of the barrel 93 is threaded longitudinally to receive a threaded spindle 95. This spindle has secured to its outer end a bearing 96. Bearing 96 has a bore which receives the hinge axis pin 43 and which supports the arm 91 for swinging movement on the same. The disposition of the contactors 94 may be adjusted by rotating the barrel 93 with respect to the spindle 95 and the parts may be clamped into position by means of a lock nut 97 screwed on the spindle 95 and engaging the end of said barrel.

For the purpose of attaching the jaw models to the apposing device D and hinge bow A two mounting fingers 98 are employed which are rigidly secured to the barrels 93 of the arms 91 and 92. These fingers may be moved toward and from the jaw models by rotating the barrels 93 on the spindles 95 and may likewise be adjusted in an anterior posterior direction by screwing said spindles out of or into said barrels. The lock nuts 97 hold the parts in adjusted positions. Similar attachments 99 are secured to the lower ends of the barrels 30 of the side frames 10 and 11. These attachments are split as best shown in Fig. 4 at 110 to form tongues 112 which overlie said fingers. Screws 111 passing through said tongues and screwed into the fingers hold the fingers in adjusted positions on the barrels 30. All of these fingers extend toward the center of the instrument and serve as mounting means on which the jaw models may be mounted.

The method of using the invention is as follows: The projections of the condylar hinge axes of the patient's condyles on his face are determined by the use of the hinge bow A and the mandible clamp B. The two side frames 10 and 11 are first mounted on the cross bar 12 by use of the connectors 61 and the mandible clamp B applied thereto. This is accomplished by attaching the clamp structure 72 to the cross bar 12 by means of the connectors 67 as shown in Fig. 6. The chin brace 76 is then mounted on the legs 74 of said clamp structure. Impression compound or similar impression material is then placed in the impression tray 114 and the same pressed down upon the ridges or teeth of the patient. Chin brace 76 is then elevated until the same engages the patient's jaw from below and acting in conjunction with the clamp member 72 rigidly attached the entire hinge bow to the patient's mandible. The side frames 10 and 11 are now adjusted so that the same are fairly close to the patient's face but still afford working clearance between the guide 42 and the patient's cheek. The hinge axis pins 43 are then inserted in the guide 42 with the points 45 brought up to within a millimeter or so of the patient's skin. At this stage the head relator C and the apposing device D are not attached to the hinge bow. The patient is now caused to shift his jaw into retruded position and to move the jaw up and down as in normal opening and closing. If the pointers 45 describe arcs of circles during such movement the location of the pointers are then adjusted until no movement relative to the face occurs. This is accomplished by swinging the upright arms 14 of the side frames 10 and 11 through manipulation of the adjusting screws 59 and by sliding the stem 17 along the bores 16 of barrels 15 of the horizontal arms 13 and by sliding the stems 32 along the bores 31 of the barrels 30 of the upright arms 14 of the said side frames. The pointers 45 then point to the projections of the condyler hinge axes of the patient's condyles on the patient's face. The projections are then marked with ink or if permanent marks are desired may be tattooed in the patient's skin and subsequently used in relocating the hinge bow to the patient. After these projections have been determined and marked the mandible clamp B is removed from the patient's mandible and detached from the hinge bow A. Before removal the projections are carefully checked to see that the skin hasn't moved after marking.

Figure 8:
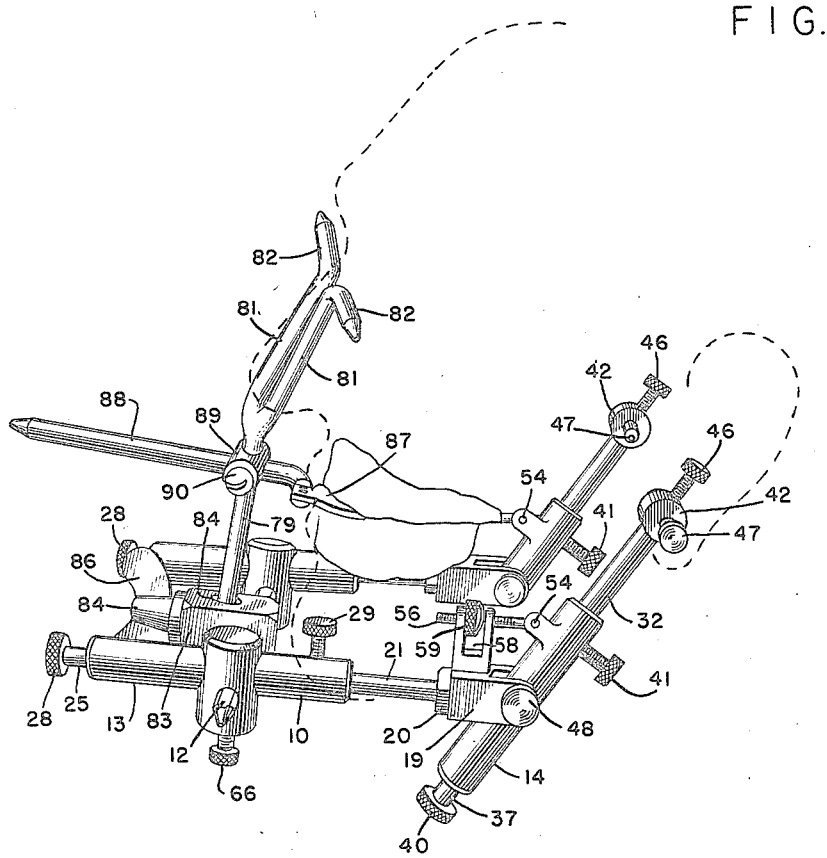
Fig. 8 is a perspective view similar to Fig. 2 and showing the instrument applied to the patient.

Assuming that the patient is edentulous and that full upper and lower plates are to be built. In such case suitable base plates constructed to fit the patient's ridges are prepared and to which are attached suitable bite blocks. A pair of such bite blocks are shown attached to the instrument in Figs. 1 and 2 and are designated by the reference numerals 100 and 101. These bite blocks with bases are then properly positioned in the patient's mouth. The bite blocks may be constructed and shaped to give to the patient the appearance desired when the teeth are finally mounted on the base plates or the same may be at this time be roughly constructed and subsequently so formed. Cross lines are then scribed on the bite blocks and the patient made to open and close his jaw. If the lines meet each time the patient closes his jaw and occludes the bite blocks, the latter are clipped together and while clipped together removed from the patient's mouth. Bite fork 87 is next heated and shoved into the upper bite block 100 with the two bite blocks securely attached to one another. The bite fork 87 is next applied to the rod 79. The head relator is now repositioned on the patient by placing the bite blocks in the patient's mouth. The nasal bearing member 80 is next adjusted by means of the thumb screw 90 until the two rests 82 register with and are in alignment with two prominences of the front of the skull or any other convenient cranial anatomical landmarks. A suitable impression material is next placed on the legs 81 of the nasal bearing member 80 and caused to engage the nose of the patient. This material when hardened forms a saddle which assists in supporting the instrument on the patient's face and relieves part of the strain on the patient's lower jaw and ridges. The connector 83 is next assembled on the cross bar 12 and the two side frames 10 and 11 reassembled on said cross bar in about the positions shown in Fig. 8. The hinge bow A is now applied to the head relator C. This is accomplished by inserting the stem 79 into the bore 84 of the connector 83. The parts are then temporarily secured in approximate position. The side frames 10 and 11 are next adjusted if necessary by means of connectors 61 and the connector 83 until the said side frames are the proper working distance from the face and so that the guides 42 are centered approximately over the condylar hinge axes projections. The pointers 45 of the hinge axes pins 43 are now adjusted using the same procedure as previously described in connection with the determination of the condylar hinge axes projections until the said pointers register with the condylar hinge axes projections marked on the patient's skin. After the instrument has been so adjusted all of the parts are firmly locked together. The positions of the parts when properly oriented to the symmetries and/or asymmetries of the patient's mandible and skull are clearly shown in Fig. 8. The entire instrument, without unloosening or removing any of the parts mounted on it at such time, is then removed from the patient's mouth. The patient is then told to assume a different head position and the bite blocks with the instrument applied thereto and undisturbed repositioned in the mouth. The condylar axes projections are then rechecked with the pointers and if any discrepancy is revealed the hinge axis pins are readjusted. This is repeated until two applications of the instrument give the same results, at which time the entire instrument is removed from the patient's mouth and left intact.

Figure 2:
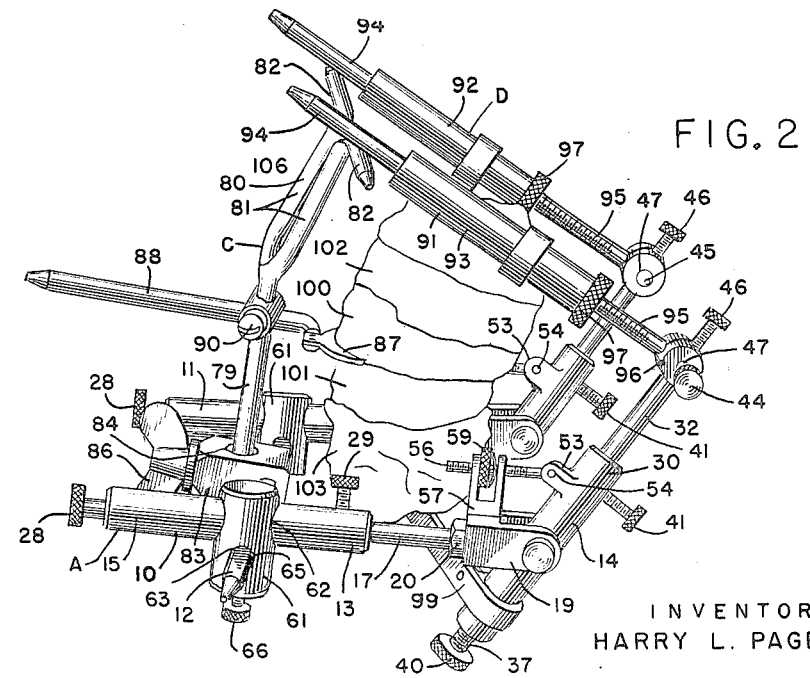
Fig. 2 is a perspective view similar to Fig. 1 of the structure shown therein and viewed from the left side.

Upon removal of the instrument from the patient's mouth the apposing device D is applied which consists in applying the bearings 96 of the arms 91 and 92 of said apposing device to the projecting ends of hinge axis pins 43. The contactors 94 are then swung downwardly until the same rest upon the bearing surfaces of the rests 82 of the head relator C, as best shown in Fig. 2. Jaw mounting models 102 and 103, which have been previously constructed, are now placed in the bite blocks 100 and 101 and the fingers 98 and 99 properly adjusted as previously described. The blocks 100 and 101 are then attached to the mounting fingers 98 and 99 by means of unset gypsum such as indicated at 104 and 105. The relation of the parts when so disposed is shown in Figs. 1 and 2. Thereafter the entire head relator C with bite fork and wax bites attached are removed from the instrument. The bite fork 87 is now heated and removed from the wax bite 100. Connector 83 may be now slid over to one side as shown in Fig. 4 where the same is out of the way. Processing of the setting up of the teeth and processing of the plates is now proceeded with in accordance with the usual practice. The instrument now serves as an articulator for determining the proper positioning of the teeth on the bite blocks. After the teeth have been properly set up the teeth are then processed in the laboratory in the customary manner and secured to the metal base plates originally attached to the bite blocks. The processed teeth are then put back on the mounted models and the instrument further used as an articulator to guide the technician in spot grinding the teeth to correct processing errors and return the teeth to the proper articulator. The instrument may also be used with the standard method which omits the original metal base plates in the final case and substitutes plastic material such as acrylic for the plates. Fig. 4 shows the dentures mounted in the instrument with the teeth in proper occlusion. After the teeth have been so prepared the same are removed from the articulator and placed in the patient's mouth for permanent use.

Where the patient has part of his teeth, wax bites may be used in place of the bite blocks or in conjunction with a single bite block where the patient has teeth on only one jaw. In such case the procedure is substantially the same as with an edentulous person and the results are identical. A description of the method of using the invention in such case will hence not be repeated.

It will be readily understood that the invention is capable of use with either dentulous or edentulous cases. In the one case bite blocks are employed and in the other one or several, wax bites. In the claims the term "registrating medium" has been employed which refers to a medium adapted to register with either the natural or artificial teeth or with the alveolar processes of edentulous patients and the term is intended to embrace either a wax bite or bite blocks.

Changes in the specific form of the invention, as herein described, may be made within the scope of what is claimed without departing from the spirit of the invention.

Having described the invention, what is claimed as new and desired to be protected by Letters Patent is:

1. In combination supporting means, attaching means mounted on the supporting means and attachable to a registrating medium between the upper and lower jaws of the patient's mouth, hinge axis pins adjustably mounted on said supporting means and adapted to be registered with condylar hinge axis projections on the patient's face while the registrating medium is in the patient's mouth, a head relator detachably mounted on said supporting means, and adapted to be correlated with reference to any convenient cranial reference points while the registrating medium is in the patient's mouth, an apposing device having bearings adapted to be hinged on the hinge axis pins after he registrating medium with appended structure has been removed from the patient's mouth, said apposing device having a part engaging a part of said head relator, mounting means carried by said apposing device and to which an upper mounting model fitted to the registrating medium may be cemented and mounting means carried by the support and to which a lower mountng model fitted to the registrating medium may be cemented.

2. In combination a hinge bow, attaching means mounted on the hinge bow and attaching the hinge bow to a registrating medium between the upper and lower jaws of the patient's mouth, said hinge bow having adjustable arms, hinge axis pins adjustably mounted on said arms and adapted to be registered with condylar hinge axis projections on the patient's face while the registrating medium is in the patient's mouth, a head relator detachably mounted on the hinge bow, said head relator having a rest adapted to be adjustably positioned to register with any convenient cranial reference point while the registrating medium is in the patient's mouth, and an apposing device having bearings adaped to be hinged on the hinge axis pins and a contactor adapted to be brought into engagement with the rest of the head relator after the registrating medium with appended structure has been removed from the patient's mouth and further having mounting means to which an upper mounting model fitted to the registrating medium may be cemented, and mounting means carried by the hinge bow and to which a lower mounting model fitted on the registrating medium may be cemented.

3. In combination a hinge bow including a cross bar, a side frame mounted thereon, said side frame including an extensible horizontal arm, a connector between said arm and cross bar and securing said parts together, an extensible upright arm, hinge means between said upright arm and the outer end of the horizontal arm, an adjustment forming a part of said horizontal arm and serving to vary the length thereof, an adjustment forming a part of said upright arm and serving to vary the length thereof, a guide at the upper end of said upright arm and having a bore whose axis is substantially parallel to said cross bar, a hinge axis pin slidably mounted in said bore and having a pointer coaxial with the axis thereof, an adjustment acting between said arms and adjustable to vary the angularity between said arms and a second side frame similar to said first side frame and attached to said cross bar.

4. In combination a hinge bow including a cross bar, a side frame mounted thereon, said side frame including an extensible horizontal arm, a connector between said arm and cross bar and securing said parts together, an extensible upright arm, hinge means between said upright arm and the outer end of the horizontal arm, an adjustment forming a part of said horizontal arm and serving to vary the length thereof, an adjustment forming a part of said upright arm and serving to vary the length thereof, a guide at the upper end of said upright arm and having a bore whose axis is substantially parallel to said cross bar, a hinge axis pin slidably mounted in said bore and having a pointer coaxial with the axis thereof, an adjustment acting between said arms and adjustable to vary the angularity between said arms, a second side frame similar to said first side frame and attached to said cross bar, arms having bearings rotatably mounted on said hinge axis pins and mounting means for an upper jaw model carried by said arms.

5. In combination, a hinge bow including a cross bar, a side frame mounted thereon, said side frame including an extensible horizontal arm, a connector between said arm and cross bar and securing said parts together, an extensible upright arm, hinge means between said upright arm and the outer end of the horizontal arm, an adjustment forming a part of said horizontal arm and serving to vary the length thereof, an adjustment forming a part of said upright arm and serving to vary the length thereof, a guide at the upper end of said upright arm and having a bore whose axis is substantially parallel to said cross bar, a hinge axis pin slidably mounted in said bore and having a pointer coaxial with the axis thereof, an adjustment acting between said arms and adjustable to vary the angularity between said arms, a second side frame similar to said first side frame and attached to said cross bar, arms having hinge means pivoted relative to the upright arms about axes coaxial with the axes of the bores of said guides and mounting means for an upper jaw model carried by said arms.

6. In combination a hinge bow including a cross bar, a side frame mounted thereon, said side frame including an extensible horizontal arm, a connector between said arm and cross bar and securing said part together, an extensible upright arm, hinge means between said upright arm and the outer end of the horizontal arm, an adjustment forming a part of said horizontal arm and serving to vary the length thereof, an adjustment forming a part of said upright arm and serving to vary the length thereof, a guide at the upper end of said upright arm and having a bore whose axis is substantially parallel to said cross bar, a hinge axis pin slidably mounted in said bore and having a pointer coaxial with the axis thereof, a screw pivoted to one arm, a guide on the other arm through which said screw extends, and having a slot therein, a nut screwed on said screw and disposed within said slot for moving said arms relative to one another.

7. In combination a hinge bow including a cross bar, a side frame mounted thereon, said side frame including an extensible horizontal arm, a connector between said arm and cross bar and securing said parts together, an extensible upright arm, hinge means between said upright arm and the outer end of the horizontal arm, an adjustment forming a part of said horizontal arm and serving to vary the length thereof, an adjustment forming a part of said upright arm and serving to vary the length thereof, a guide at the upper end of said upright arm and having a bore whose axis is substantially parallel to said cross bar, a hinge axis pin slidably mounted in said bore and having a pointer coaxial with the axis thereof, an adjustment acting between said arms and adjustable to vary the angularity between said arms said horizontal arm having a cylindrical portion, a mounting finger formed with a bore through which said cylindrical portion extends, said finger being slidable and rotatable on said cylindrical portion and clamping means acting between said finger and arm for restraining movement therebetween and a second side frame similar to said first side frame and attached to said cross bar.

8. The method of accurately reproducing with jaw models articulation of the human jaws and teeth, in a patient having marks at the condylar hinge axes projections, which method consists in applying a registrating medium to the alveolar processes of the patient's jaws, in attaching a bite fork to the registering medium, in attaching the bite fork to a hinge bow having movable hinge axis pins and a movable head relator formed with a rest, in fixing the rest at an arbitrarily selected cranial reference point, in moving the hinge axis pins opposite the condylar hinge axis projection marks when the patient's jaws are in their terminal hinge axis position, in locking the parts in position, in removing the registrating medium with attached structure intact from the patient, in applying an apposing device having a contactor and hinge axis pin bearings to the hinge bow with the bearing hinged on the hinge axis pins of the hinge bow and with the contactor engaging the rest of the head relator, in applying mounting models to the registrating medium, in fixedly cementing the models to the hinge bow and to the apposing device and in swinging the hinge bow and the apposing device with the models attached relative to one another about the axes of the hinge axis pins.

9. The method of accurately reproducing with jaw models articulation of the human jaws and teeth, in a patient having marks at the condylar hinge axes projections, which method consists in applying bite blocks to the patient's alveolar ridges, in securing the bite blocks together when the patient's jaws are in terminal hinge axis position, in attaching a bite fork to the bite blocks, in attaching the bite fork to a hinge bow having movable hinge axis pins and a movable head relator formed with a rest, in fixing the rest at an arbitrarily selected cranial reference point, in moving the hinge axis pins opposite the condylar hinge axis projection marks when the patient's jaws are in their terminal hinge axis position, in locking the parts in position, in removing the bite blocks with attached structure intact from the patient, in applying an apposing device having a contactor and hinge axis pin bearings to the hinge bow with the bearing hinged on the hinge axis pins of the hinge bow and with the contactor engaging the rest of the head relator, in applying mounting models to the bite blocks, in fixedly cementing the models to the hinge bow and to the apposing device and in swinging the hinge bow and the apposing device with the models attached relative to one another about the axes of the hinge axis pins.

10. The method of accurately reproducing with jaw models articulation of the human jaws and teeth, in a patient having marks at the condylar hinge axes projections, which method consists in attaching wax to a bite fork and inserting the fork and wax in the patient's mouth, in bringing the patient's jaws together with the condyles at their terminal hinge axis position, in attaching the bite fork to a hinge bow having movable hinge axis pins and a movable head relator formed with a rest, in fixing the rest at an arbitrarily selected cranial reference point, in moving the hinge axis pins opposite the condylar hinge axis projection marks when the patient's jaws are in their terminal hinge axis position, in locking the parts in position, in removing the wax bite with attached structure intact from the patient, in applying an apposing device having a contactor and hinge axis pins bearing to the hinge bow with the bearings hinged on the hinge axis pins of the hinge bow and with the contactor engaging the rest of the head relator, in applying models of the patient's upper and lower teeth to the wax bite, in fixedly cementing the models to the hinge bow and to the apposing device and in swinging the hinge bow and the apposing device with the models attached relative to one another about the axes of the hinge axis pins.

11. In combination a hinge bow having side frames each constructed with a substantially horizontal arm and an upright arm, a cross bar extending across and secured to said horizontal arms, hinge axis pins adjustably mounted at the upper ends of said upright arms, adjusting means associated with said arms and serving to allow movement of said hinge axis pins both laterally and in an up and down direction, a mandible clamp secured to said cross bar and including an upper clamp member and a lower clamp member and guide means acting between said members for accommodating relative movement therebetween in an up and down direction, and locking means for holding the parts in adjusted position.

12. In combination a hinge bow having side frames each constructed with a substantially horizontal arm and an upright arm, a cross bar extending across and secured to said horizontal arms, hinge axis pins adjustably mounted at the upper ends of said upright arms, adjusting means associated with said arms and serving to allow movement of said hinge axis pins both laterally and in an up and down direction, a mandible clamp having an upper clamp member, legs depending downwardly therefrom, connectors connected to said cross bar and to said legs for holding the legs adjustably attached to said cross bar, a lower clamp member slidably mounted on said legs and movable toward and from the upper clamp member and locking means for holding said clamp members in fixed relative position.

13. In combination, a head relator including a bite fork, a registering medium thereon adapted to be disposed between the upper and lower jaws when placed in the patient's mouth, said head relator further including a nasal bearing member of upright U-shape and having spaced legs adapted to straddle the nose of the patient, rests extending outwardly from said legs at the upper ends thereof one on each side of said bearing member and having aligning bearing surfaces, adjustable connecting means between said nasal bearing member and said bite fork and accommodating movement of said rests relative to the bite fork to bring the bearing surfaces in register with any convenient cranial reference points of the patient when the registering medium is in the patient's mouth, a hinge bow, an upright attached to said head relator, an adjustable connector between said upright and hinge bow for securing the head relator to the hinge bow and accommodating up and down movement of said hinge bow relative to said head relator, hinge axis pins on said hinge bow adjustable to register with the condylar hinge axis projections on the patient's face while the registrating medium is in the patient's mouth, mounting means carried by the hinge bow and to which a lower mounting model fitted on the registrating medium may be cemented and an apposing device hinged about axes concentric with the axes of the hinge pins and movable toward and from said rests and to which an upper mounting model fitted on the registrating medium may be cemented.

14. In combination, a head relator including a bite fork, a registrating medium thereon adapted to be disposed between the upper and lower jaws when placed in the patient's mouth, said head relator further including a transversely disposed nasal bearing member having an opening in the intermediate portion of the same through which the nose of the patient may extend and being formed with rests having upwardly facing bearing surfaces disposed one on each side of said opening, connecting means between said bearing member and bite fork and accommodating movement of said nasal bearing member relative to the bite fork to bring the bearing surfaces in register with any convenient cranial reference points of the patient when the registering medium is in the patient's mouth, a hinge bow, an upright attached to said head relator, an adjustable connector between said upright and hinge bow for securing the head relator to the hinge bow and accommodating up and down movement of said hinge bow relative to said head relator, hinge axis pins on said hinge bow adjustable to register with the condylar hinge axis projections on the patient's face while the registrating medium is in the patient's mouth, mounting means carried by the hinge bow and to which a lower mounting model fitted on the registrating medium may be cemented and an opposing device hinged about axes concentric with the axes of the hinge pins and movable toward and from said rests and to which an upper mounting model fitted on the registrating medium may be cemented.

15. In combination, a head relator including a bite fork member, a registrating medium thereon adapted to be disposed between the upper and lower jaws when placed in the patient's mouth said head relator further including a nasal bearing member having an opening therein through which the patient's nose may project, and an upwardly facing bearing surface on each side of said opening, an upright attached to one of said members, a connector connected to the other member and slidable and rotatable on said upright, a hinge bow, and a connector between said hinge bow and upright for securing the head relator to said hinge bow and guiding said hinge bow for vertical and swinging movement relative to said head relator.

16. In combination, a head relator including a bite fork member, a registrating medium thereon adapted to be disposed between the upper and lower jaws when placed in the patient's mouth, said head relator further including a nasal bearing member having an opening therein through which the patient's nose may project, and an upwardly facing bearing surface on each side of said opening, an upright attached to one of said members, a connector connected to the other member and slidable and rotatable on said upright, a hinge bow including a cross bar, and a connector between said cross bar and upright and guiding said hinge bow for horizontal, vertical and swinging movement relative to said head relator.

References Cited in the file of this patent

UNITED STATES PATENTS

| 1,033,562 | Eltner | July 23, 1912 |
| 1,080,809 | Burch | Dec. 9, 1913 |